(No Model.)

L. B. WHITE.
GRIP FOR CABLE RAILWAYS.

No. 349,867. Patented Sept. 28, 1886.

WITNESSES.
W. N. Rosenbaum.
Carl Kerz

INVENTOR
Lewis B. White
BY
Goepel & Raegener
ATTORNEYS.

N. PETERS, Photo-Lithographer, Washington, D. C.

UNITED STATES PATENT OFFICE.

LEWIS B. WHITE, OF NEW YORK, N. Y., ASSIGNOR TO LEON ABBETT, OF JERSEY CITY, NEW JERSEY.

GRIP FOR CABLE RAILWAYS.

SPECIFICATION forming part of Letters Patent No. 349,867, dated September 28, 1886.

Application filed March 20, 1886. Serial No. 195,906. (No model.)

*To all whom it may concern:*

Be it known that I, LEWIS B. WHITE, of the city, county, and State of New York, have invented certain new and useful Improvements in Grips for Cable Railways, of which the following is a specification.

This invention relates to certain new and useful improvements in the devices usually provided on cable-railway cars for the purpose of gripping and holding the cable to the car.

The object of my invention is to prevent the wear and tear of the cable and of the devices for holding it by reducing the friction to a minimum.

The invention consists in making the jaws, gripping-rollers, or grip parts of the grip which come into direct contact with the cable and act on the same, of tough glass.

Figure 1:
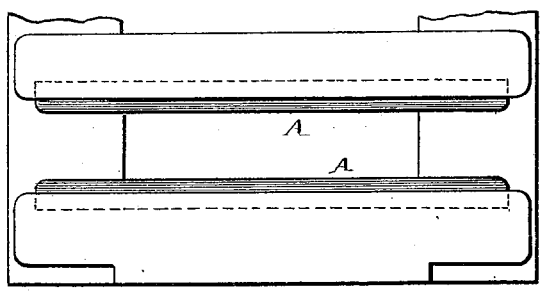
Figure 2:
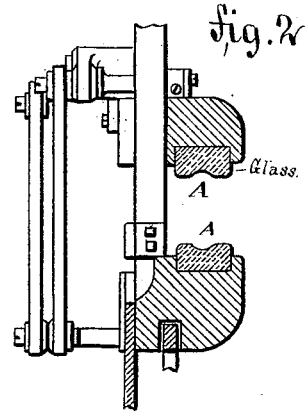
Figure 3:
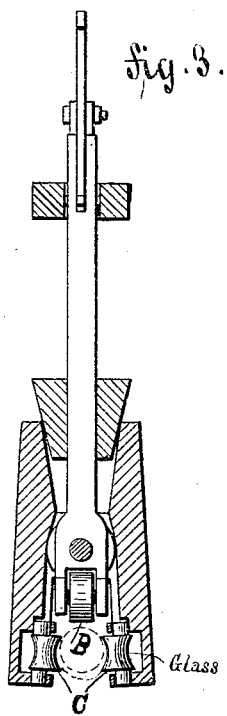
Figure 4:
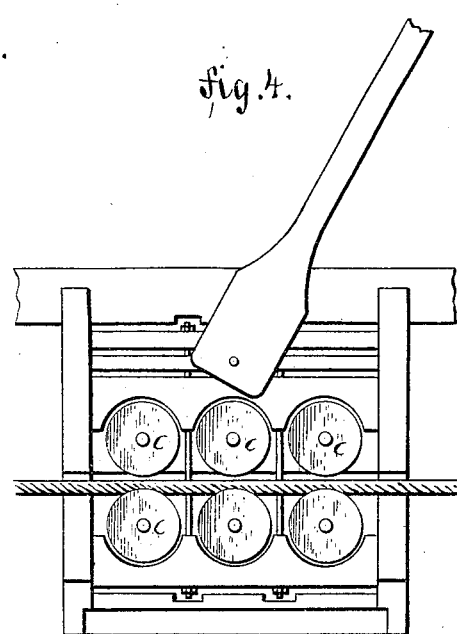
Figure 5:
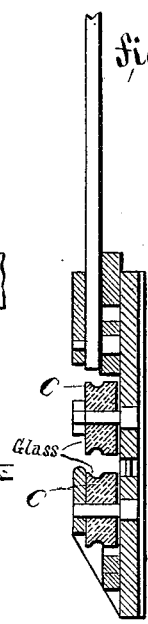

In the accompanying drawings, Figure 1 is a cross-sectional view of a grip of my construction provided with my improved glass gripping devices. Fig. 2 is a face view of the grip shown in Fig. 1. Figs. 3, 4, and 5 are views of other grips provided with my improved glass gripping device.

Similar letters of reference indicate corresponding parts.

The jaws A, between which the cable is gripped for the purpose of holding it fast to the frame of the gripping device, are made of glass, and may have any suitable shape for gripping and holding the cable. The glass used must have great tenacity, as little brittleness as possible, and considerable hardness. The friction produced by the cable on the glass is very little, and is by no means injurious to the cable, nor is the glass itself affected by the cable. The glass jaws do not heat as rapidly as the metal jaws do, nor do they wear off as rapidly as wooden, leather, and vulcanite jaws.

In some grips—as, for instance, in those shown in Figs. 3, 4, and 5—rollers C are used for gripping the cable, and are the equivalents of the jaws. Said rollers, if desired, may be provided with a metal pivot or axis, which may be fixed or loose. In many cases guide-rollers B form an essential part of the grip, and they also are to be made of glass.

Having thus described my invention, I claim as new and desire to secure by Letters Patent—

1. A cable-grip having the guiding and clamping devices made of glass, substantially as shown and described.

2. In a cable-grip, the combination, with glass jaws or gripping devices, of mechanism for operating the same, substantially as shown and described.

3. A cable-grip having its jaws and guide-rollers made of glass, substantially as shown and described.

In testimony that I claim the foregoing as my invention I have signed my name in presence of two subscribing witnesses.

LEWIS B. WHITE.

Witnesses:
OSCAR F. GUNZ,
DANIEL JACKSON.